UNITED STATES PATENT OFFICE.

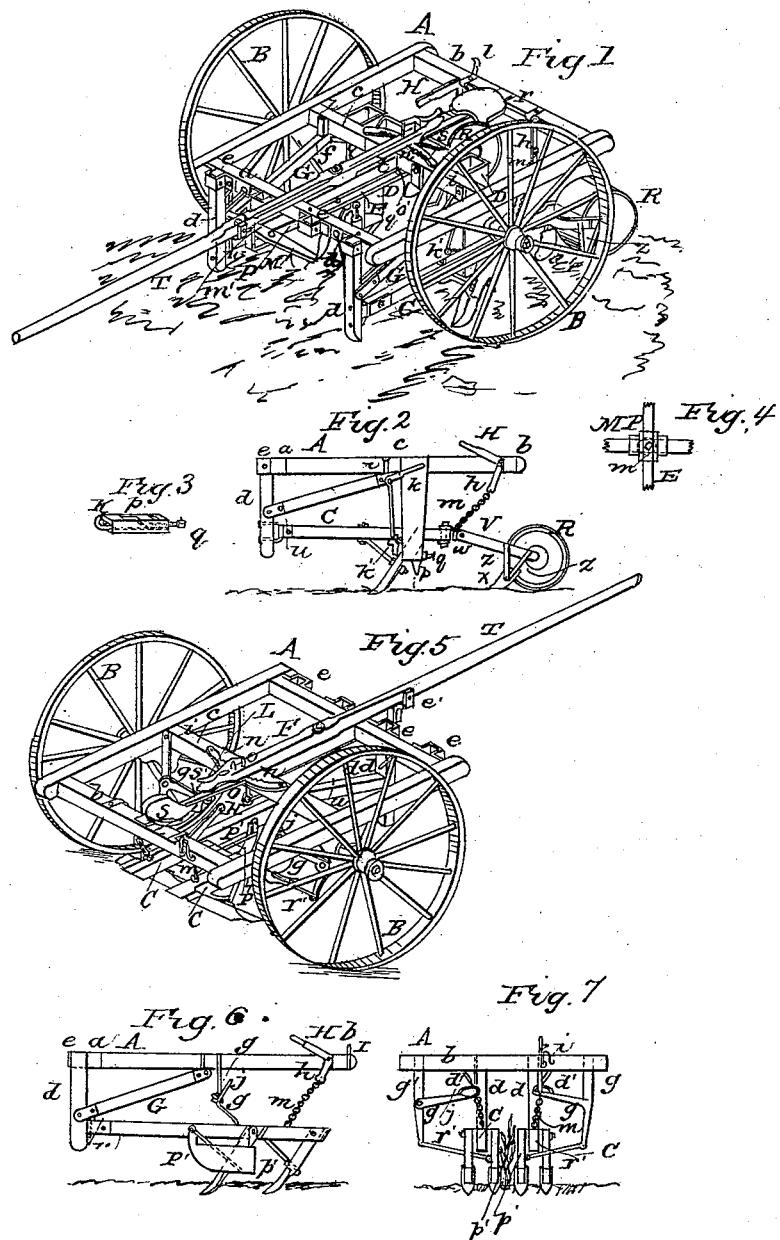

CLARK SINTZ, OF CLARK COUNTY, OHIO.

IMPROVEMENT IN CORN PLOWS AND PLANTERS.

Specification forming part of Letters Patent No. 107,110, dated September 6, 1870.

*To all whom it may concern:*

Be it known that I, CLARK SINTZ, of the county of Clark and State of Ohio, have invented certain new and useful Improvements in Corn and Seed Plows and Planters; and I do hereby declare that the following is a full, clear, and exact description thereof, reference being had to the accompanying drawings, and to the letters marked thereon, in which similar letters indicate like parts.

My invention consists in a bed-frame mounted upon wheels. To this bed-frame plows and planting attachments are connected. Two posts depend from the front rail, to which the plow-beams are attached by a hinge-joint, so as to admit of an up-and-down and side motion. The posts are strengthened by braces extending from their lower parts to the center rail, where they are bolted to angular plates. Metal braces also connect them with the front of the bed-frame. The posts and braces are made so as to be readily attached to other points on the bed-frame in changing the machine from a planter to a plow, the metal braces in front being changed to the opposite sides of the posts when the latter are moved. When used as a planter, but one plow is attached to each beam. In the rear of this is a roller swung in a metal frame, and attached to the end of the plow-beam by a cross-joint or jointed clevis. To each side of the roller-frame covering-shovels are attached. These project forward of the roller, throwing the earth over the seed dropped, the roller following and leveling the ridge made by the covering shovels or plows. A dropper with a long seed-box is attached to the back part of the center rail, the discharge-tube of which is directed behind the furrowing-plow on either side. These droppers are worked by a lever extending from one to the other. The seat for the driver is on the rear of the machine, and is made adjustable. The raising and lowering mechanism is attached to the rear rail, with chains connecting it to the rear of plow-beams. The hand-lever operating it is held down by a spring-catch on back part of frame. The tongue is pivoted upon the top of the machine, near its front, by a bolt passing vertically through it, about four feet from its rear end, which extends back to rear of machine, the part behind the bolt forming a lever to switch the machine when required to be on an angle with the line of draft, the object of this arrangement being to run the machine into fence-corners, to plant and cultivate the land therein, and to give greater ease and facility in turning at the ends of rows. The tongue is held in position at an angle with the machine by a latch-bolt, (connected to a spring-lever on the rear of the tongue,) which drops into notches in a segment or slide-plate under it. A flat draft-bar extends forward under the bed-frame from the the center rail, (where it is flexibly attached to a ring-bolt,) and, bending upward, slips into a loop-plate on the under side of the tongue. The double-tree has a stay-plate under it, resting on the draft-bar. The groove in it (which fits upon either side of the draft-bar) has the shape of two opposite curves or arcs of a circle, having their nearest approximation at the center of the plate, where the tongue-belt passes through it. The object of this plate is to check or stay unequal or sudden draft. In plowing small corn or cotton I reverse the double-tree, putting it on the under side of the draft-bar, which brings the draft lower. The drawings show the entire machine both as plow and planter. When my machine is changed from a planter to a plow, the droppers and attachments are taken off, and the plows, with the rollers and covering-shovels, are removed, the plow-beams being detached by removing the bolts which pass through the side straps of the clevis on their ends. The gang plows and shields are substituted for the planting-plows, being attached in like manner. Angular foot-levers suspended from the center rail of the machine, and connected with the standards of the forward plows, are used to operate the same. These foot-levers are provided with stirrups for the feet, a side motion being given to the plows by pressing down or raising these levers.

Figure 1 is a perspective view of my machine as a planter, showing the manner in which the tongue is pivoted, the dropping attachments, furrowing-plows, covering-shovels, and roller, also the raising and lowering mechanism. Fig. 2 shows a sectional view of the bed-frame plows and planting attachments, also the manner in which the roller-frames are attached to the ends of the plow-beams. Fig. 3 is a view of the sliding block which works in the lower end of the dropper, with its valve and set-screw. Fig. 4 is a view of the stay-plate, which is attached to the double-tree, and works on the forward part of the draft-bar. Fig. 5 is a perspective view of my machine as a plow or cultivator. The switching-tongue and attachments are seen similar to those in Fig. 1. The droppers, furrowing-plows, covering-shovels, and rollers are removed. The depending posts and braces are changed to other points on the frame, and gang-plows, with their shields, are substituted, together with the angular foot-levers and their connections for operating them. Fig. 6 is a longitudinal section of the same. Fig. 7 is a rear view of the same.

In Fig. 1, A is the bed-frame; B, the wheels; $a$, the front rail; $c$, the center and $b$ the back rail of frame. Tongue T is pivoted on top of frame, near the front, by bolt $f$. That part behind $f$ marked F is used as a lever to switch machine.

$o$ is a bolt attached to spring-lever L, dropping into notches $n\,n$ of slide-plate $s$ on center rail, $c$.

E is the draft-bar, the rear end of which is attached to ring-bolts $o'$. It passes forward under frame of machine, bends upward and forward at right angles, and slips into loop $e'$ on under side of tongue T.

M is the double-tree; P, the stay-plate, Figs. 1 and 4. Bolt $m'$ pivots double-tree and stay-plate to draft-bar.

H is the hand-lever for raising and lowering plows and attachments. It is held by spring-catch $l$ on back rail, $b$.

$d\,d$ are posts depending from front of frame, to which plow-beams C are attached by strap, clevis, or joint $u$. These posts are fastened to rectangular plates or loops $e\,e$ on front rail by bolts and nuts, so as to be readily changed to others when desired to change machine from planter to plow, or vice versa.

$d'\,d'$ are metal braces, which can be changed to opposite sides of posts $d\,d$ when the latter are moved.

G G are wooden braces attached at their forward ends to lower part of posts $d\,d$, and, extending back in line with plow-beams C, are attached at their rear ends to angular plates $i\,i$ on center rail, $c$, by bolts and nuts also, so that they can be moved with posts $d\,d$, and attached in like manner to other plates, $i\,i$, (shown in the drawings.) The straps on the ends of plow-beams C slide freely up and down on the rods on lower parts of posts $d$ (which form the clevis $u$) as the plows sink into or are raised above the ground, keeping the beams at all times parallel with its surface.

Droppers D D (seen in the planter) are worked by hand-lever $k$, extending from one to the other, producing a simultaneous movement of the mechanism in the two. Lever $k$ extends through lugs on the dropper-boxes under center rail, $c$, and has a coiled spring upon that part between the lugs, which throws the lever up when pressed down. It is connected by rods with angular levers $k'\,k'$, which work sliding blocks K of the droppers. These latter have valves $p$, with set-screw $q$, for regulating the sizes of the discharge-holes, Figs. 2 and 3.

R R are rollers swung in frames or bars V V, which have covering-shovels $x\,x$ attached to them by braces $z\,z$.

In Fig. 5 the angular foot-levers $g\,g$ are pivoted at their angles to the suspending-bar $g'\,g'$. $j\,j$ are stirrups on the ends of their horizontal arms. The lower arms of these foot-levers are connected to the plow-standards by rods $r'\,r'$. They are bent backward to shape them for easy movement by the feet, as shown in Fig. 6. Shields P' are formed with an angle, $p'$, at the heel, and are set in an inclined position outward, to prevent clods of dirt from rolling upon the young plants.

I claim as my invention—

1. The combination of draft-bar E with stay-plate P, double-tree M, tongue T, bolt $f$, and frame A, when used in a corn plow and planter, substantially as and for the purpose hereinbefore set forth.

2. The arrangement of the angular foot-levers $g\,g$, stirrups $j\,j$, suspending-bars $g'\,g'$, and connecting-rods $r\,r$, in connection with frame A, tongue T, and bolt $f$, substantially as and for the purpose hereinbefore set forth.

CLARK SINTZ.

Witnesses:
  B. C. CONVERSE,
  GEO. MOWER.